United States Patent
Tracy et al.

(10) Patent No.: US 12,370,603 B2
(45) Date of Patent: Jul. 29, 2025

(54) ADAPTIVE MANUFACTURING USING CT SCAN DATA

(71) Applicant: Pratt & Whitney Canada Corp., Longueuil (CA)

(72) Inventors: Kevin M. Tracy, Wichita Falls, TX (US); Charles Trent Daulton, Burkburnett, TX (US)

(73) Assignee: Pratt & Whitney Canada Corp., Longueuil (CA)

( * ) Notice: Subject to any disclaimer, the term of this patent is extended or adjusted under 35 U.S.C. 154(b) by 215 days.

(21) Appl. No.: 17/942,038

(22) Filed: Sep. 9, 2022

(65) Prior Publication Data
US 2024/0082923 A1    Mar. 14, 2024

(51) Int. Cl.
| | |
|---|---|
| *B22F 10/85* | (2021.01) |
| *B22F 10/28* | (2021.01) |
| *B22F 10/66* | (2021.01) |
| *B33Y 10/00* | (2015.01) |
| *B33Y 30/00* | (2015.01) |
| *B33Y 40/20* | (2020.01) |
| *B33Y 50/00* | (2015.01) |

(52) U.S. Cl.
CPC .............. *B22F 10/85* (2021.01); *B22F 10/28* (2021.01); *B22F 10/66* (2021.01); *B33Y 10/00* (2014.12); *B33Y 30/00* (2014.12); *B33Y 40/20* (2020.01); *B33Y 50/00* (2014.12)

(58) Field of Classification Search
CPC .......... B22F 10/85; B22F 10/28; B22F 10/66; B33Y 10/00; B33Y 50/00
See application file for complete search history.

(56) References Cited

U.S. PATENT DOCUMENTS

| 8,140,179 | B2 | 3/2012 | Drechsler | |
|---|---|---|---|---|
| 8,910,361 | B2 * | 12/2014 | Rickenbacher | B23P 6/005 |
| | | | | 29/402.13 |
| 9,174,312 | B2 | 11/2015 | Baughman | |

(Continued)

FOREIGN PATENT DOCUMENTS

| DE | 102019203796 A1 * | 9/2020 |
|---|---|---|
| EP | 3933527 A1 | 1/2022 |

(Continued)

OTHER PUBLICATIONS

EP Search Report for EP Patent Application No. 23195541.0 dated Feb. 8, 2024.

*Primary Examiner* — Anthony M Liang
(74) *Attorney, Agent, or Firm* — Getz Balich LLC

(57) ABSTRACT

A method is disclosed for providing a component. During this method, braze powder is deposited with a substrate. The braze powder is sintered together during the depositing of the braze powder to provide the substrate with sintered braze material. The sintered braze material is heated to melt the sintered braze material and to diffusion bond the sintered braze material to the substrate to provide braze filler material. A first object is scanned using computed tomography to provide first object scan data. The first object includes the substrate and the braze filler material diffusion bonded to the substrate. The first object scan data is compared to first object reference data to provide machining data. The first object is machined using the machining data to provide a second object.

19 Claims, 6 Drawing Sheets

(56) References Cited

U.S. PATENT DOCUMENTS

| | | | |
|---|---|---|---|
| 9,505,172 | B2 | 11/2016 | Ljungblad |
| 9,764,517 | B2 | 9/2017 | Potter |
| 9,902,024 | B2 | 2/2018 | Ernst |
| 10,814,439 | B2 | 10/2020 | Ozturk |
| 11,097,350 | B2 | 8/2021 | Twelves, Jr. |
| 11,285,538 | B2 | 3/2022 | Shi |
| 11,305,353 | B2 | 4/2022 | Geisen |
| 2006/0163323 | A1 | 7/2006 | Pietruska |
| 2007/0228108 | A1 | 10/2007 | Goldschmidt |
| 2009/0026182 | A1 | 1/2009 | Hu |
| 2015/0217415 | A1 | 8/2015 | Andolfi |
| 2018/0243866 | A1 | 8/2018 | Srinivasan |
| 2018/0281125 | A1 | 10/2018 | Burbaum |
| 2021/0069832 | A1 | 3/2021 | Burbaum |
| 2021/0299802 | A1 | 9/2021 | Shin |
| 2022/0212396 | A1 | 7/2022 | Tardif |
| 2022/0212397 | A1 | 7/2022 | Edy |

FOREIGN PATENT DOCUMENTS

| | | | | |
|---|---|---|---|---|
| FR | 3103401 A1 | * | 5/2021 | ............. B22F 10/00 |
| FR | 3103401 B1 | | 7/2023 | |
| JP | 2009025119 A | | 2/2009 | |
| WO | 2015161980 A1 | | 10/2015 | |
| WO | 2018211010 A1 | | 11/2018 | |
| WO | 2019177607 A1 | | 9/2019 | |

* cited by examiner

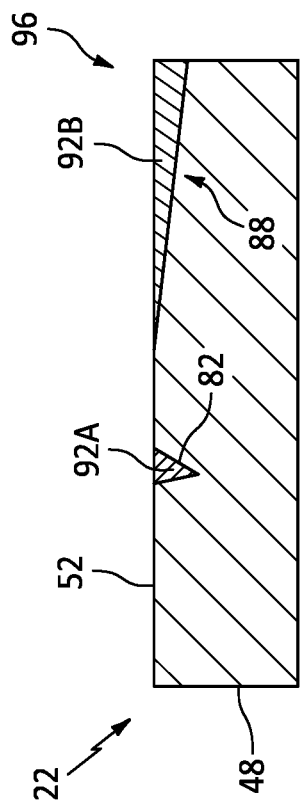
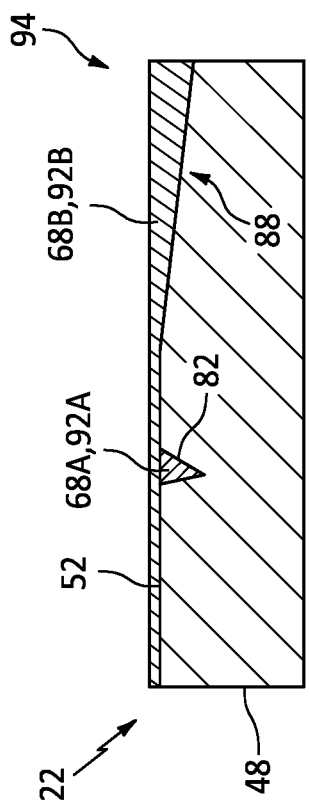
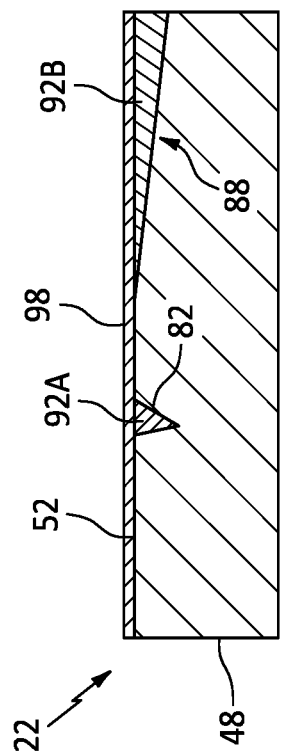

ADAPTIVE MANUFACTURING USING CT SCAN DATA

TECHNICAL FIELD

This disclosure relates generally to manufacturing a component using additive manufacturing.

BACKGROUND INFORMATION

Defects in a component may be overhauled using braze filler material or weld filler. Various processes are known in the art for applying braze filler material and for welding filler material to a component. While these known processes have various advantages, there is still room in the art for improvement. In particular, there is a need in the art for overhaul processes which can reduce material waste and/or decrease formation of secondary (process related) defects in a substrate of the component.

SUMMARY

According to an aspect of the present disclosure, a method is disclosed for providing a component. During this method, braze powder is deposited with a substrate. The braze powder is sintered together during the depositing of the braze powder to provide the substrate with sintered braze material. The sintered braze material is heated to melt the sintered braze material and to diffusion bond the sintered braze material to the substrate to provide braze filler material. A first object is scanned using computed tomography to provide first object scan data. The first object includes the substrate and the braze filler material diffusion bonded to the substrate. The first object scan data is compared to first object reference data to provide machining data. The first object is machined using the machining data to provide a second object.

According to another aspect of the present disclosure, another method is disclosed for providing a component. During this method, a substrate is scanned using a computed tomography device to provide substrate scan data. The substrate scan data is compared to substrate reference data to provide additive manufacturing data. Braze powder is deposited with the substrate using an additive manufacturing device based on the additive manufacturing data. The braze powder is sintered to provide the substrate with sintered braze material. The sintered braze material is heated to melt the sintered braze material and to diffusion bond the sintered braze material to the substrate. A first object is scanned using the computed tomography device to provide first object scan data. The first object includes the substrate and the sintered braze material diffusion bonded to the substrate. The first object scan data is compared to first object reference data to provide machining data. The first object is machined using the machining data to provide a second object.

According to still another aspect of the present disclosure, a system is disclosed for providing a component that includes a substrate. This system includes a scanning device, a controller, an additive manufacturing device, a furnace and a machining device. The scanning device is configured to scan the substrate using computed tomography to provide substrate scan data indicative of one or more characteristics of the substrate. The scanning device is also configured to scan a first object using the computed tomography to provide first object scan data indicative of one or more characteristics of the first object. The controller is configured to compare the substrate scan data to substrate reference data to provide additive manufacturing data. The controller is configured to compare the first object scan data to first object reference data to provide machining data. The additive manufacturing device is configured to deposit braze powder with the substrate based on the additive manufacturing data. The braze powder is sintered using a laser of the additive manufacturing device during the depositing of the braze powder to provide the substrate with sintered braze material. The furnace is configured to melt the sintered braze material and to facilitate diffusion bonding of the sintered braze material to the substrate to provide the first object. The machining device is configured to machine the first object based on the machining data.

The substrate reference data may be or otherwise include data from a specification for the component. In addition or alternatively, the first object reference data may be or otherwise include the substrate scan data.

The braze powder may be deposited using an additive manufacturing device.

The method may also include: scanning the substrate using computed tomography to provide substrate scan data; and comparing the substrate scan data to substrate reference data to provide additive manufacturing data. The braze powder may be deposited with the substrate based on the additive manufacturing data.

The substrate reference data may be or otherwise include data from a design specification for the component.

The first object reference data may be or otherwise include the substrate scan data.

The method may also include: depositing second braze powder with the substrate based on the additive manufacturing data, the second braze powder different than the first braze powder and configured from or otherwise including second braze powder which is sintered together during the depositing of the second braze powder to provide the substrate with sintered second braze material; and heating the sintered second braze material to melt the sintered second braze material and to diffusion bond the sintered second braze material to the substrate to provide second braze filler material. The first object may also include the second braze filler material diffusion bonded to the substrate.

The braze powder may be deposited with the substrate to repair a first type of defect of the substrate. The second braze powder may be deposited with the substrate to repair a second type of defect of the substrate that is different than the first type of defect.

The depositing of the braze powder may include: directing the braze powder towards the substrate through a nozzle; and sintering the braze powder using a laser beam.

The depositing of the second braze powder may include: directing the second braze powder towards the substrate through the nozzle; and sintering the second braze powder using the laser beam.

The machining may remove some of the braze filler material diffusion bonded to the substrate.

The braze powder may be deposited with the substrate to fill a void in the substrate.

The method may also include: depositing second braze powder with the substrate to form a cladding on the substrate, the second braze powder different than the first braze powder and is sintered together during the depositing of the second braze powder to provide the substrate with sintered second braze material; and heating the sintered second braze material to melt the sintered second braze material and to diffusion bond the sintered second braze material to the substrate to provide second braze filler material. The first object may also include the second braze filler material diffusion bonded to the substrate.

The cladding formed from the second braze powder may cover the void filled with the braze material.

The braze powder may include metal alloy powder and braze material powder with a lower melting point than the metal alloy powder.

The braze powder may have a first ratio of the metal alloy powder to the braze material powder. The second braze powder may include the metal alloy powder and the braze material powder. The second braze powder may have a second ratio of the metal alloy powder to the braze material powder. The second ratio may be greater than the first ratio.

The braze powder may be deposited with the substrate to form a cladding over the substrate.

The method may also include receiving a damaged component previously installed within an engine. The depositing, the heating and the machining may be performed to repair the damaged component to provide the component.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 5-11 are partial sectional illustrations of the component during various steps of the adaptive manufacturing method.

DETAILED DESCRIPTION

Figure 1:
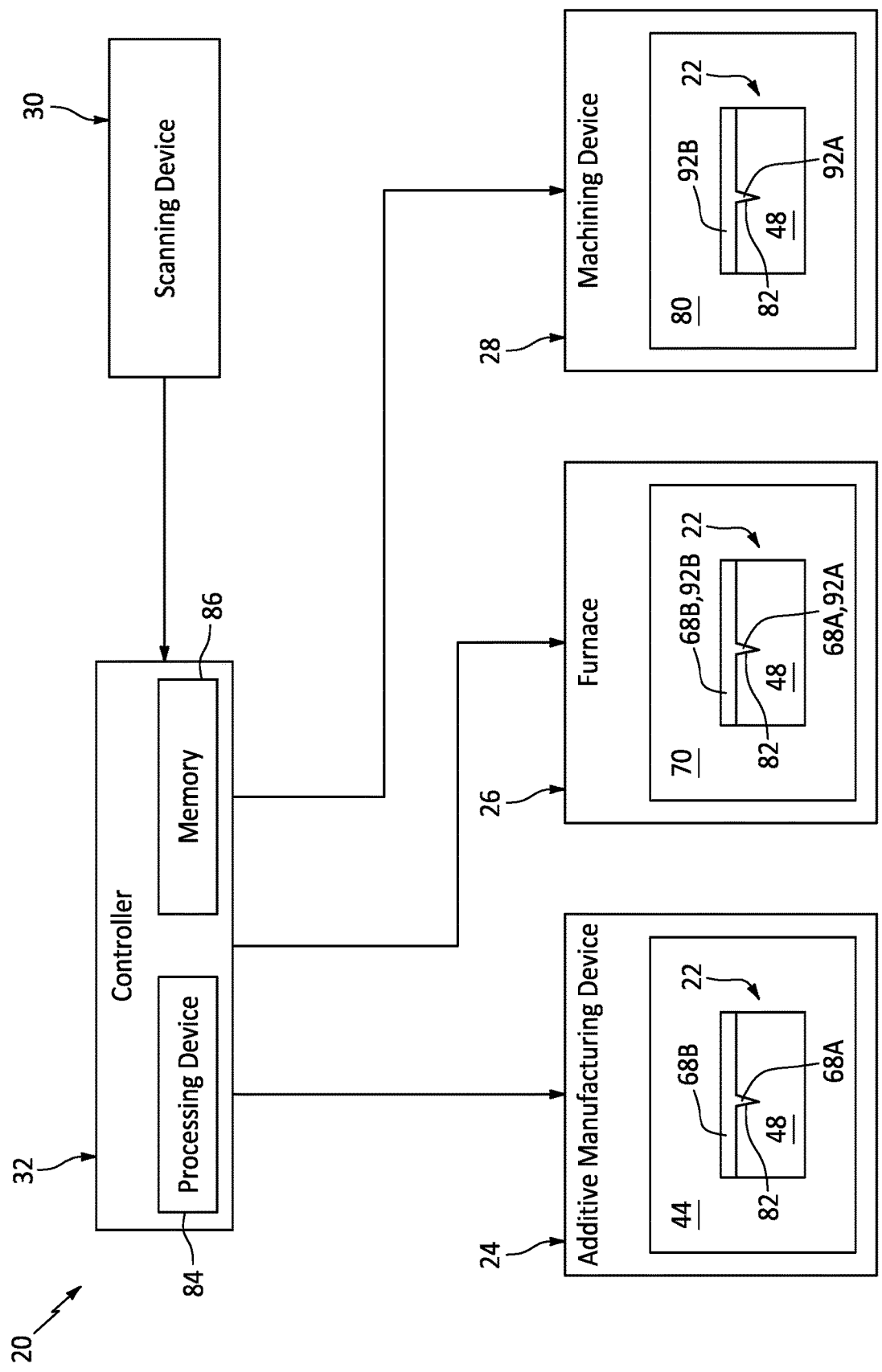
FIG. 1 is a schematic illustration of a system for adaptively manufacturing a component.

The present disclosure includes systems and methods for adaptively manufacturing or otherwise providing a component. Herein, the term "manufacturing" may describe a process for forming the component; e.g., creating a brand new component. The term "manufacturing" may also or alternatively describe a process for overhauling (e.g. overhauling) the component; e.g., restoring one or more features of a previously formed component to brand new condition, similar to brand new condition or better than brand new condition. The component, for example, may be overhauled to fix one or more defects (e.g., cracks, wear and/or other damage) imparted during previous use of the component. The component may also or alternatively be overhauled to fix one or more defects imparted during the initial formation of the component. For ease of description, however, the manufacturing systems and methods may be described below with respect to overhauling the component.

The component may be any stationary component within a hot section of the gas turbine engine; e.g., a combustor section, a turbine section or an exhaust section. Examples of the stationary component include, but are not limited to, a vane, a platform, a gas path wall, a liner and a shroud. The present disclosure, however, is not limited to stationary component applications. The engine component, for example, may alternatively be a rotor blade; e.g., a turbine blade. The present disclosure is also not limited to hot section engine components. For ease of description, however, the manufacturing systems and methods may be described below with respect to overhauling a gas turbine engine component such as a turbine vane or other stators within the turbine section.

The component may be included in various gas turbine engines. The component, for example, may be included in a geared gas turbine engine where a gear train connects one or more shafts to one or more rotors in a fan section, a compressor section and/or any other engine section. Alternatively, the component may be included in a direct-drive gas turbine engine configured without a gear train. The component may be included in a gas turbine engine configured with a single spool, with two spools, or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines. Furthermore, it is contemplated the manufacturing systems and methods of the present disclosure may alternatively be used to manufacture component(s) for non-gas turbine engine applications; e.g., for reciprocating piston internal combustion engine applications, for rotary internal combustion engine applications, etc.

FIG. 1 schematically illustrates an exemplary system 20 for adaptively manufacturing (e.g., adaptively overhauling or forming) the component 22. This manufacturing system 20 includes an automated additive manufacturing (AM) device 24 (e.g., a three-dimensional (3D) printer), a furnace 26, an automated machining device 28 (e.g., a computer numerical control (CNC) machining device) and a scanning device 30. The manufacturing system 20 of FIG. 1 also includes a controller 32 in signal communication (e.g., hardwired and/or wirelessly coupled) with one or more or all of the other manufacturing system components 24, 26, 28 and 30.

Figure 2:
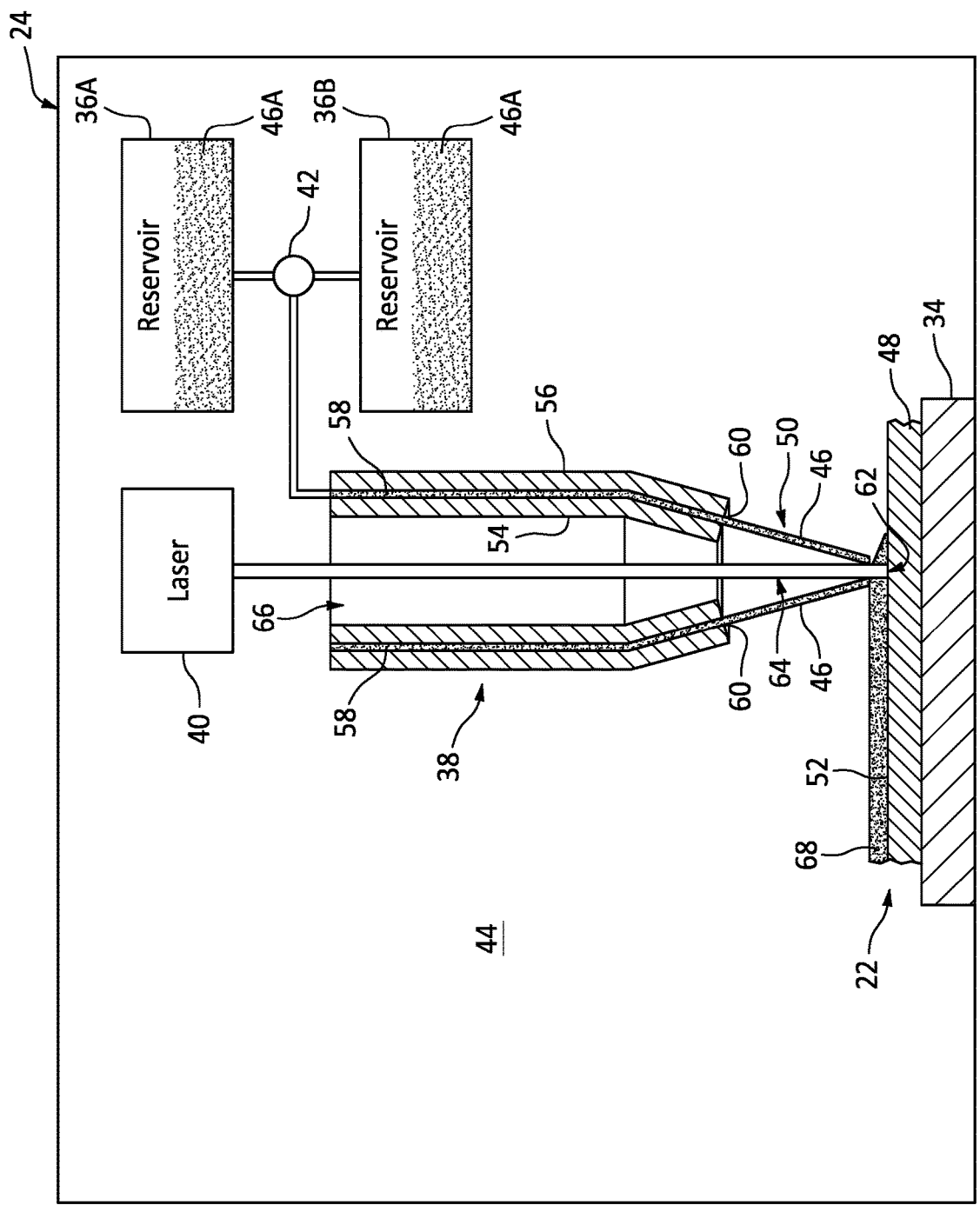
FIG. 2 is a schematic illustration of an additive manufacturing device.

Referring to FIG. 2, the additive manufacturing device 24 may be configured as a laser material deposition device. More particularly, the additive manufacturing device 24 may be configured as a direct laser braze cladding (DLBC) device. The additive manufacturing device 24 of FIG. 2, for example, includes a component support 34, one or more material reservoirs 36A and 36B (generally referred to as "36"), at least (or only) one nozzle 38, and at least (or only) one laser 40. The additive manufacturing device 24 of FIG. 2 also includes a material regulation device 42.

The component support 34 is located within an internal build chamber 44 of the additive manufacturing device 24. This component support 34 is configured to support the component 22 within the build chamber 44. The component 22, for example, may be placed on top of the component support 34. The component 22 may also or alternatively be mounted to the component support 34 via a fixture, which fixture may arrange the component 22 in a fixed position and/or in a known spatial orientation within the build chamber 44.

The first material reservoir 36A is configured to store a quantity of first braze powder 46A formed from first braze material; e.g., braze material powder and metal alloy powder. This first material reservoir 36A is also configured to supply the first braze powder 46A to the nozzle 38 (e.g., through the material regulation device 42) during select additive manufacturing device operations. Examples of the first material reservoir 36A include, but are not limited to, a tank, a hopper and a bin.

The second material reservoir 36B is configured to store a quantity of second braze powder 46B formed from second braze material; e.g., braze material powder and metal alloy powder. This second material reservoir 36B is also configured to supply the second braze powder 46B to the nozzle 38 (e.g., through the material regulation device 42) during select additive manufacturing device operations. Examples of the second material reservoir 36B include, but are not limited to, a tank, a hopper and a bin.

The material regulation device 42 is fluidly coupled with and between the material reservoirs 36 and the nozzle 38. The material regulation device 42 is configured to selectively direct the first braze powder 46A from the first material reservoir 36A to the nozzle 38 during a first mode. The material regulation device 42 is configured to selectively direct the second braze powder 46B from the second material reservoir 36B to the nozzle 38 during a second mode. The material regulation device 42 may also (or may not) be configured to selectively direct one or more combinations of the first braze powder 46A from the first material reservoir 36A and the second braze powder 46B from the second material reservoir 36B to the nozzle 38 during a third mode. Examples of the material regulation device 42 include, but are not limited to, a valve or valves, a pump or pumps, an auger or augers, and a powder metering wheel or wheels.

The nozzle 38 is configured to deliver the first braze powder 46A received from the first material reservoir 36A, the second braze powder 46B received from the second material reservoir 36B or a combination of the first braze powder 46A and the second braze powder 46B to a substrate 48 of the component 22 during additive manufacturing device operation. More particularly, the nozzle 38 is configured to direct a (e.g., annular, conical) stream 50 of the braze powder 46A and/or 46B (generally referred to as "46") towards (e.g., to) a surface 52 of the substrate 48. The nozzle 38 of FIG. 2, for example, includes a tubular inner sidewall 54 and a tubular outer sidewall 56. The outer sidewall 56 extends axially along and circumscribes the inner sidewall 54 so as to form a passage 58 (e.g., an annulus) between the inner sidewall 54 and the outer sidewall 56. This passage 58 is fluidly coupled with outlets from the material reservoirs 36A and 36B through the material regulation device 42, and the passage 58 extends axially within the nozzle 38 to a (e.g., annular) nozzle orifice 60. A distal end portion of the nozzle 38 and its inner sidewall 54 and its outer sidewall 56 may radially taper inwards as the nozzle 38 extends axially toward (e.g., to) the nozzle orifice 60. With such an arrangement, the nozzle 38 may focus the braze powder 46 to, around or about a target point 62 on, slightly above or slightly below the substrate surface 52. However, in alternative embodiments, the nozzle 38 may be configured to deliver the braze powder 46 through an internal bore rather than an annulus.

The laser 40 is configured to generate a laser beam 64 for sintering the braze powder 46 delivered by the nozzle 38 together and to the substrate 48. Herein, the term "sintering" may describe a process for coalescing powder particles together into a (e.g., porous) mass by heating without (e.g., partial or complete) liquification of the powder. This is in contrast to, for example, a powder laser welding process where powder is melted to a liquid state (e.g., in a melt pool) by a laser beam and then solidified as a solid mass. The laser 40 of FIG. 2 is configured to direct the laser beam 64 to or about the target point 62, where the laser beam 64 may be incident with and is operable to heat up the braze powder 46 for sintering. The laser beam 64 of FIG. 2 is directed through an (e.g., central) internal bore 66 of the nozzle 38, which internal nozzle bore 66 may be formed by the inner sidewall 54. However, in other embodiments, the laser 40 may be configured to direct the laser beam 64 outside of the nozzle 38 or along another path through the nozzle 38.

The additive manufacturing device 24 may also include a system for cleaning up and/or reclaiming unused powder within the build chamber 44. This cleaning/reclamation system, in particular, may clean up (e.g., dust off) excess, un-used braze powder 46A, 46B which has not been sintered by the laser beam 64. The cleaning may prevent cross-contamination between the braze powders 46A and 46B. The cleaning may also or alternatively prevent inadvertent sintering of excess braze powder 46 during an iterative layer-by-layer build process. The braze powder 46 removed from the build chamber 44 may subsequently be reclaimed for later use; e.g., returned to its respective reservoir 36. Of course, the different braze powders 46A and 46B may also or alternatively be utilized in different build chambers 44.

Referring to FIG. 1, the furnace 26 is configured to receive the substrate 48 with the sintered first braze material 68A and/or the sintered second braze material 68B (generally referred to as "68") within an internal treatment chamber 70 of the furnace 26. The furnace 26 is further configured to subject the substrate 48 and the sintered braze material(s) 68 to a heat cycle, for example under vacuum and/or in a partial pressure inert gas (e.g., argon (Ar) gas) environment. During this heat cycle, the sintered braze material(s) 68 may melt and diffusion bond to the substrate 48. An example of the furnace 26 is a vacuum furnace.

Figure 3:
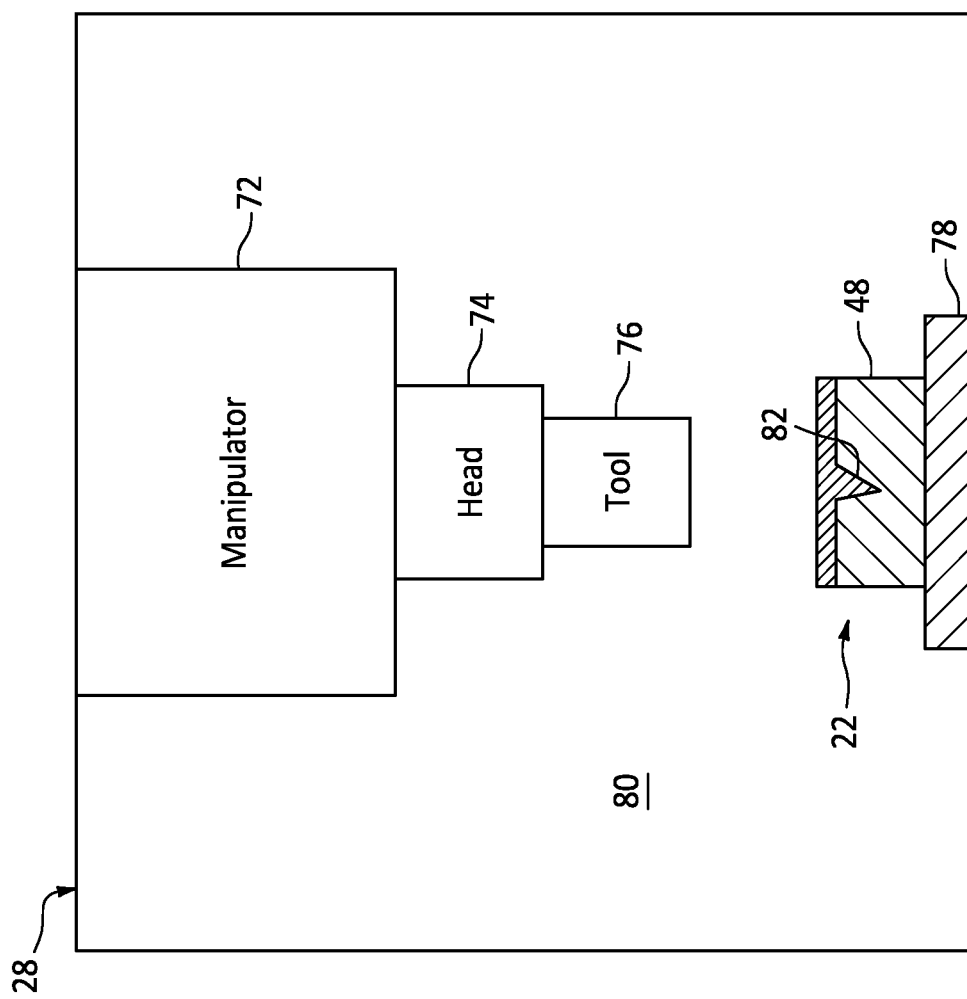
FIG. 3 is a schematic illustration of a machining device.

Referring to FIG. 3, the machining device 28 includes a manipulator 72, a head 74 and at least one machining tool 76 mated with the head 74. The machining device 28 of FIG. 3 also includes a component support 78, which may be the same as or similar to the component support 34 of FIG. 2. The manipulator 72 is configured to move the head 74 and the machining tool 76 within an internal machining chamber 80 of the machining device 28 relative to the component 22. The manipulator 72, for example, may be a multi-axis (e.g., 3-axis, 5-axis, 7-axis, etc.) manipulator such as, but not limited to, a robotic arm and/or a gantry system. The head 74 is configured to hold the machining tool 76. The head 74 is also configured to facilitate actuation of the machining tool 76; e.g., rotate the machining tool 76 about an axis. The machining tool 76 is configured to machine the component 22; e.g., remove material from the component 22. Examples of the machining tool 76 include, but are not limited to, a drill bit, a milling bit, a milling cutter, a grinding bit, a sanding bit and a polishing bit. The present disclosure, however, is not limited to such an exemplary machining device with one or more machining tools; e.g., rotatable bits. For example, in other embodiments, the machining device 28 may also or alternatively include a laser to laser machine the component 22 within the machining chamber 80 and/or an electrical discharge machining (EDM) device to machine the component 22 within the machining chamber 80. A welding device (e.g., an electron beam welding device) may be arranged with the machining device 28 for welding the component 22 within the machining chamber 80. The machining device 28 may also include an inert gas system to support the laser machining and/or welding operations.

Referring to FIG. 1, the scanning device 30 is configured to map a surface geometry of, one or more dimensions of and/or one or more spatial coordinates for a portion (or multiple portions) of or an entirety of an exterior of the component 22. Briefly, the term "map" may describe a process of determining (e.g., measuring) and collecting certain information. The scanning device 30 may also be configured to map a geometry of, one or more dimensions of and/or one or more spatial coordinates for a feature (or multiple features) in the component 22; e.g., a void 82 such as, but not limited to, a crack, a fracture, a slice, a gouge, a dimple, etc. The scanning device 30 of FIG. 1, in particular, is configured as a computed tomography (CT) device, also sometimes referred to as a computed tomography (CT) imaging device. This scanning device 30 may particularly be useful in mapping relatively small feature(s) and/or otherwise obscured feature(s) in the component 22 which may be invisible or relatively concealed from the exterior of the component 22.

The controller 32 may be implemented with a combination of hardware and software. The hardware may include at least one processing device 84 and a memory 86, which processing device 84 may include one or more single-core and/or multi-core processors. The hardware may also or alternatively include analog and/or digital circuitry other than that described above.

The memory 86 is configured to store software (e.g., program instructions) for execution by the processing device 84, which software execution may control and/or facilitate performance of one or more operations such as those described below. The memory 86 may be a non-transitory computer readable medium. For example, the memory 86 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 4:
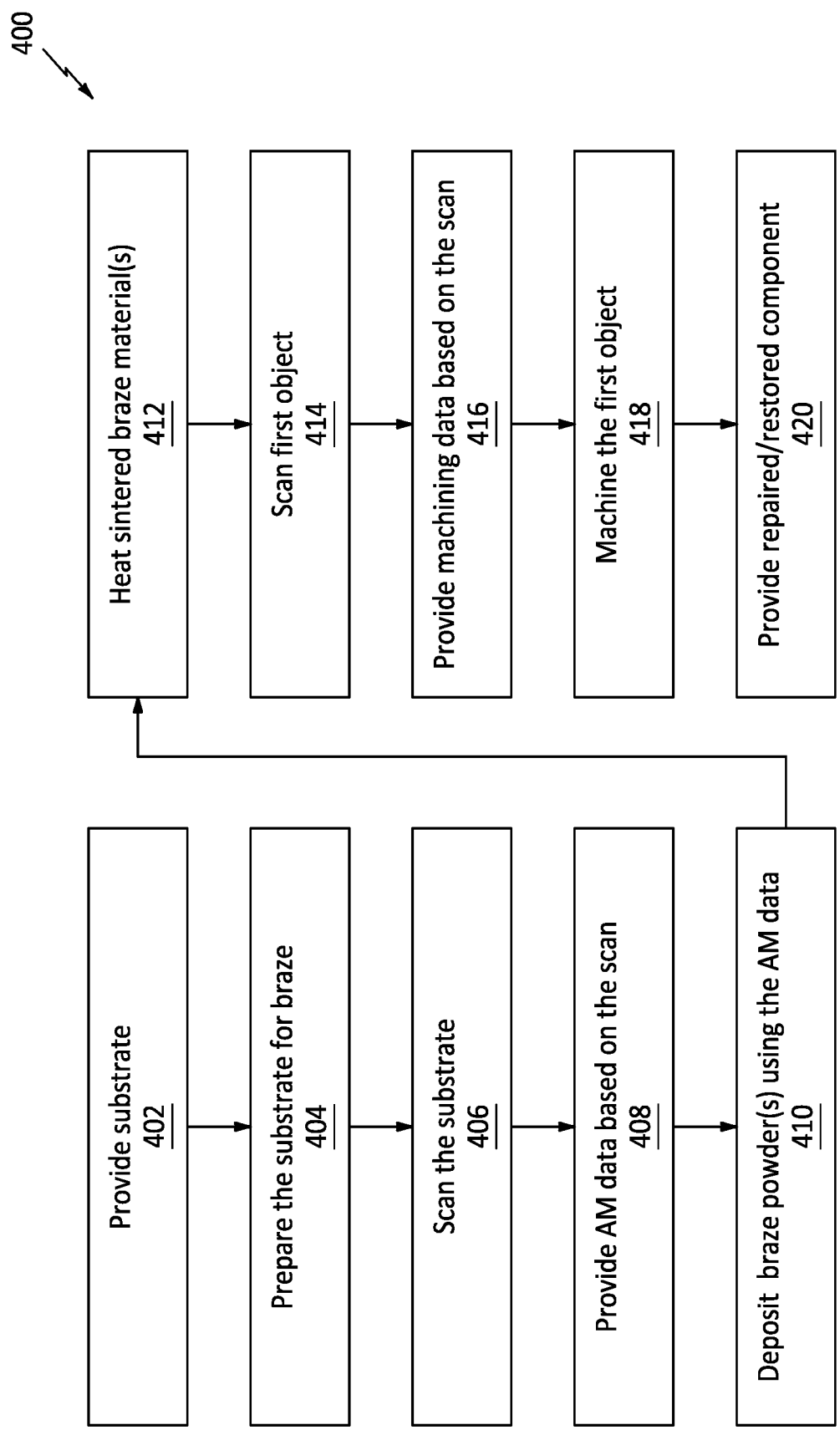
FIG. 4 is a flow diagram of an adaptive method for manufacturing the component.

FIG. 4 is a flow diagram of an exemplary adaptive method 400 for manufacturing (e.g., overhauling or forming) the component 22. For ease of description, the manufacturing method 400 is described with respect to the manufacturing system 20 and overhauling the component 22. The manufacturing method 400, however, is not limited to any particular manufacturing system types or configurations. Furthermore, some or all of the method steps may alternatively be performed to form a new component.

Figure 5:
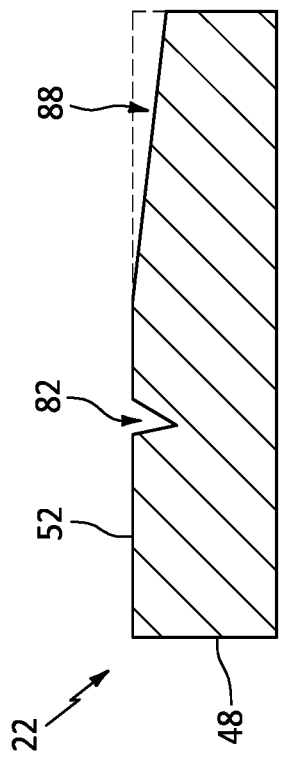

In step 402, referring to FIG. 5, the substrate 48 is provided. For ease of description, this substrate 48 is described as part of a damaged component; e.g., a worn and/or cracked component previously installed within an engine. For example, the component 22 of FIG. 5 includes at least one void 82. This void 82 projects partially into the component 22 and its substrate 48 from the exterior of the component 22. The component 22 of FIG. 5 also includes a wear region 88 where a portion of the component 22 and its substrate 48 has been worn away due to, for example, erosion, rubbing and/or otherwise. Of course, in other embodiments, the component 22 may include multiple voids 82, multiple wear regions 88, the void(s) 82 without any wear region, the wear region(s) 88 without any void, and/or one or more other substrate defects.

Figure 6:
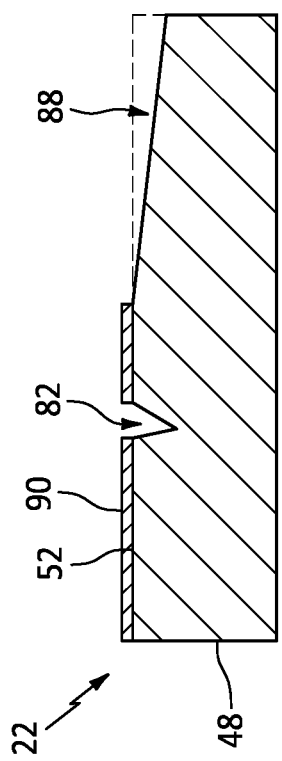

In step 404, referring to FIG. 6, the substrate 48 is prepared for the braze powder(s) 46. A coating 90 (see FIG. 5) over at least a portion or an entirety of the substrate 48, for example, may be removed to expose the underlying substrate 48 and its substrate surface 52. The coating 90 may be removed using various techniques such as, but not limited to, chemical stripping, abrasive blasting, waterjet blasting and/or machining. In addition or alternatively, the void 82 may be machined (e.g., enlarged, smoothed, etc.), cleaned out and/or otherwise processed. This preparation step 404 may be performed by the machining device 28 and/or other devices part of or discrete from the manufacturing system 20. The substrate surface 52 may also be prepared (e.g., treated) for braze powder deposition. Examples of such surface preparation may include, but are not limited to: fluoride ion cleaning (FIC); reverse electroplating, electroplating to introduce a more wettable interface, such as nickel (Ni); nickel honing (e.g., nicroblasting); acid etching; and/or wet abrasive honing. Fluoride ion cleaning (FIC) may be particularly useful for removing oxides from deep within tips of narrow cracks, which may facilitate subsequent deep penetration of braze into the cracks for (e.g., complete) healing of the cracks.

In step 406, the substrate 48 is scanned using computed tomography (CT). The scanning device 30 of FIG. 1, for example, scans the substrate 48 of FIG. 6 to map one or more exterior characteristics of the substrate 48 and/or one or more interior characteristic of the substrate 48. Examples of the exterior substrate characteristics include, but are not limited to, a surface geometry of, one or more dimensions of and/or one or more spatial coordinates for a portion (or multiple portions) of or an entirety of an exterior of the substrate 48. Examples of the interior substrate characteristics include, but are not limited to, a geometry of, one or more dimensions of and/or one or more spatial coordinates for a feature (or multiple features) within the substrate 48 or projecting into the substrate 48; e.g., the void 82. The scanning device 30 then provides substrate scan data to the controller 32 indicative of the one or more mapped substrate characteristics. The scan data may be in the form of a computer aided design (CAD) model file; e.g., a CATIA™ model file.

In step 408, the substrate scan data is processed to provide additive manufacturing (AM) data. The controller 32 of FIG. 1, for example, may compare (e.g., align) the one or more mapped substrate characteristics from the substrate scan data with respective characteristics from substrate reference data. This substrate reference data may be data input from (or derived from) a (e.g., original equipment manufacturer (OEM)) design specification for the component 22. In other words, the controller 32 may compare the one or more mapped characteristics for the substrate 48 being worked on (e.g., overhauled) to one or more corresponding characteristics of a (e.g., theoretical) design space component; e.g., a component formed according to the design specification. The controller 32, for example, may generate a solid model of the scanned substrate 48 to compare to a solid model of the design space component. The controller 32 may thereby evaluate the current state/condition of the substrate 48, and determine what additive operations may be performed (e.g., select which braze powder(s) to deposit, determine amounts of the braze powder(s) to deposit, determine where to deposit the braze powder(s), determine path(s) to follow for the depositing of the braze powder(s), etc.) to place the substrate 48 of FIG. 6 into like new (or new) condition; e.g., to have the same (or similar) characteristics as the design space component. For example, the controller 32 may identify material deficits between the solid model of the scanned substrate 48 and the solid model of the design space component, and determine how to fill those material deficits with the braze powder(s). The additive manufacturing data may include one or more commands for the additive manufacturing device 24 to place the substrate 48 of FIG. 6 into the like new (or new) condition.

Figure 7:
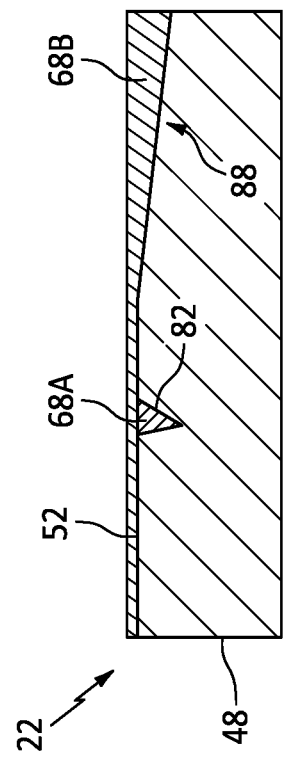
Figure 8:
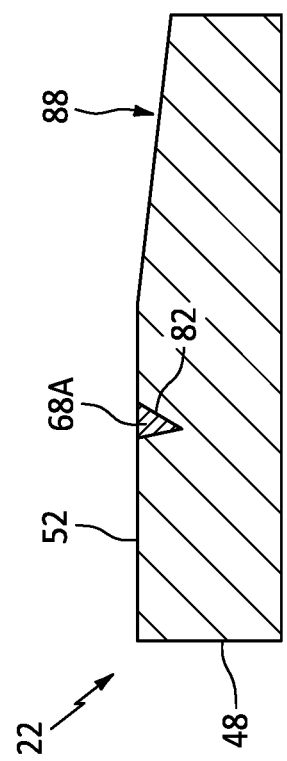

In step 410, referring to FIGS. 2, 7 and 8, the first braze powder and/or the second braze powder are selectively deposited with the substrate 48 using the additive manufacturing device 24. The first braze powder and/or the second braze powder are selectively deposited based on/according to the additive manufacturing data; e.g., command(s) provided by the controller 32.

The first braze powder 46A may be deposited with the substrate 48 to repair a first type of substrate defect such as, but not limited to, the void 82 in the substrate 48 of FIG. 7. The second braze powder 46B, by contrast, may be deposited with the substrate 48 to repair a second type of substrate defect (different than the first type of substrate defect) such as, but not limited to, the wear region 88 of FIG. 8. More particularly, the first braze powder 46A may be provided (e.g., selected, formulated, etc.) for increased wettability and/or capillary penetration. The first braze powder may thereby be particularly suited for entering and filling voids; e.g., see FIG. 7. The second braze powder 46B, on the other hand, may be provided (e.g., selected, formulated, etc.) for improved dimensional repair of the surface due to lower wettability. The second braze powder may thereby be particularly suited for forming claddings; e.g., see FIG. 8. Of course, it is contemplated the first braze powder 46A and the second braze powder 46B may be mixed together in some proportion to provide a combined braze powder with intermediate braze properties.

The first braze powder 46A may include a mixture of metal alloy powder (e.g., substrate powder) and braze material powder. The metal alloy powder may be selected to have a relatively high melting point and common (the same) or similar material properties as the substrate 48. The metal alloy powder, for example, may be made from a common (or a similar) material as the underling substrate 48; e.g., an aluminum (Al) superalloy, a nickel (Ni) superalloy, a titanium (Ti) superalloy, etc. The braze material powder, on the other hand, may be selected to have a relatively low melting point, which is lower than the melting point of the metal alloy powder. The braze material powder, for example, may include a common or similar base element as the substrate 48 and/or the metal alloy powder (e.g., aluminum (Al), nickel (Ni) or titanium (Ti)) without the super alloying elements. The brazing powder may also include boron (B), silicon (Si) and/or other melting point suppressants which may help facilitate melting and diffusion of the metal alloy powder with the substrate 48. The present disclosure, however, is not limited to the foregoing exemplary braze materials.

The second braze powder 46B may include a mixture of the metal alloy powder (e.g., substrate powder) and the braze material powder. A ratio of the metal alloy powder to the braze material powder in the second braze powder 46B may be greater than a ratio of the metal alloy powder to the braze material powder in the first braze powder 46A. For example, the second braze powder 46B may include higher proportions of the metal alloy powder relative to the braze material powder (e.g., 70/30). By contrast, the first braze powder 46A may include lower proportions of the metal alloy powder relative to the braze material powder (e.g., 60/40). The present disclosure, however, is not limited to the foregoing exemplary braze powder makeups. For example, in other embodiments, one or more or all of the constituent materials in the first braze powder may be different that one or more or all of the constituent materials in the second braze powder.

During the braze powder deposition, the additive manufacturing device 24 of FIG. 2 may deposit the respective braze powder 46 onto the substrate 48 at or about the target point 62. The laser 40 may concurrently sinter this respective braze powder 46 at the target point 62 together and/or to the underlying substrate 48. Referring to FIG. 7, the additive manufacturing device 24 may be positioned and operated to provide the sintered first braze material 68A within the void 82; e.g., to partially or completely fill the void 82. Referring to FIG. 8, the additive manufacturing device 24 may be positioned and operated to provide a cladding (e.g., a layer or multiple layers) of the sintered second braze material 68B over the wear region 88; e.g., to build back worn away substrate material. The additive manufacturing device 24 may also or alternatively be positioned and operated to provide a cladding (e.g., a layer or multiple layers) of the sintered second braze material 68B over the sintered first braze material 68A and/or one or more other (e.g., adjacent) regions of the substrate 48.

The additive manufacturing device 24 may selectively deposit the first braze powder and/or the second braze powder over the substrate 48 such that (e.g., only) areas which need repair (and optionally areas adjacent and/or surrounding those areas) are filled with the sintered first braze material 68A and/or coated with the sintered second braze material 68B. Of course, in other embodiments, the first braze powder and/or the second braze powder may be deposited over an entirety of the substrate 48 where excess material may later be removed. The first braze powder and/or the second braze powder may be deposited (e.g., built up) as one or more layers during the step 410.

In step 412, referring to FIG. 9, the substrate 48 and the sintered braze material(s) 68 are heated. The substrate 48 with the sintered braze material(s) 68, for example, may be arranged within the treatment chamber 70 of the furnace 26 of FIG. 1. The furnace 26 may subject the substrate 48 with the sintered braze material(s) 68 to a heat cycle. More particularly, the substrate 48 with the sintered braze material(s) 68 may be heated to an elevated temperature within a partial pressure inert gas environment. The elevated temperature is selected such that the sintered braze material(s) 68 melt and flows into defects of the substrate 42 by capillary action. Once the sintered braze material has melted, a relatively lower temperature may be selected and held in the same heat cycle for a duration. This sustained temperature may facilitate diffusion of the melting point suppressant material. This diffusion of the melting point suppressant material may facilitate athermal solidification, resulting in a braze diffusion bond of the sintered material to the substrate 48. The athermal solidification may describe solidification of the melted sintered braze material under, for example, a constant temperature. The diffusion duration may be between four (4) hours and twelve (12) hours, but may be much shorter or longer depending on materials being diffusion brazed and/or desired material properties and diffusion bond to one another/to the substrate 48 to form a solid addition to the substrate 48. This elevated temperature, however, is less than a melting point temperature of the substrate material. The elevated temperature for the braze melt, for example, may be between 1,500° F. and 2,500° F. The elevated temperature for the braze diffusion, for example, may be between 1,000° F. and 2,400° F. The inert gas environment may have a vacuum pressure range between, for example, 0.5 microns and 0.1 microns. The present disclosure, however, is not limited to the foregoing exemplary heat cycle parameters, and the foregoing heat cycle parameters may vary depending upon the specific material composition of the substrate 48 and the braze material, dimensions (e.g., thickness) of the sintered braze material(s) 68, etc.

Following the heating step 412, first braze filler material 92A (e.g., the diffusion bonded first braze material) of FIG. 9 may heal the void 82. The first braze filler material 92A, for example, may partially or completely fill the void 82. The second braze filler material 92B (e.g., the diffusion bonded second braze material) may provide a cladding over the substrate 48 to restore a dimensional parameter of and/or reinforce the wear region 88 and/or other regions. The second braze filler material 92B, for example, may buildup the wear region 88 back to or above a dimensional parameter specified therefor by a design specification or an overhaul specification for the component 22.

In step 414, a first object 94 (e.g., the substrate 48 with the braze filler material(s) 92) is scanned using computed tomography (CT). The scanning device 30 of FIG. 1, for example, scans the first object 94 of FIG. 9 to map one or more exterior characteristics of the first object 94 and/or one or more interior characteristic of the first object 94. Examples of the exterior first object characteristics include, but are not limited to, a surface geometry of, one or more dimensions of and/or one or more spatial coordinates for a portion (or multiple portions) of or an entirety of an exterior of the first object 94. Examples of the interior first object characteristics include, but are not limited to, a geometry of, one or more dimensions of and/or one or more spatial coordinates for a feature (or multiple features) within the first object 94 or projecting into the first object 94; e.g., a void. The scanning device 30 then provides first object scan data to the controller 32 indicative of the one or more mapped first object characteristics. The scan data may be in the form of a computer aided design (CAD) model file; e.g., a CATIA™ model file.

In step 416, the first object scan data is processed to provide machining data. The controller 32 of FIG. 1, for example, may compare (e.g., align) the one or more mapped first object characteristics from the first object scan data with one or more respective mapped substrate characteristics from the substrate scan data; e.g., the pre-additive manufacturing scan data. The controller 32 may also or alternatively compare (e.g., align) the one or more mapped first object characteristics from the first object scan data with respective characteristics from other first object reference data. This other first object reference data may be data input from (or derived from) the design specification for the component 22. The controller 32 may thereby evaluate the current state/condition of the first object 94, and determine what subtractive operations may be performed (e.g., amounts of material to be removed, where to remove the material, path(s) for the machining tool 76 to follow, etc.) to place the first object 94 of FIG. 9 into like new (or new) condition; e.g., to have the same (or similar) characteristics as the design space component. The additive manufacturing data may include one or more commands for the machining device 28 to place the first object 94 of FIG. 9 into the like new (or new) condition.

In step 418, referring to FIG. 10, a second object 96 is formed. The machining device 28 of FIG. 3, for example, selectively removes material from the first object 94 to form the second object 96. This first object material is removed based on/according to the machining data; e.g., command(s) provided by the controller 32. The first object material may thereby be selectively removed to at least partially restore or otherwise place the component 22 into the like new (or new) condition. The material removed from the first object 94 may include some of the braze filler material(s) 92 and/or some of the substrate material. This material may be removed by the machining device 28 through drilling, cutting, grinding, milling, polishing, sanding and/or otherwise.

In step 420, referring to FIG. 11, the second object 96 may be processed to provide an overhauled/restored component. One or more coatings 98, for example, may be applied to the second object 96 (see FIG. 11). Examples of these coatings 98 include, but are not limited to, bond coating(s), environmental coating(s), thermal barrier coating(s), etc.

In some embodiments, referring to FIG. 2, the respective braze powder 46 and the laser beam 64 may be concurrently directed to the common target point 62 for the braze powder deposition. In other embodiments, however, the laser beam 64 may alternatively be directed to a different target point than the respective braze powder 46. The laser beam target point, for example, may alternatively be spaced from and follow the braze powder target point.

In some embodiments, the respective braze powder 46 may be sintered using the laser beam 64. The present disclosure, however, is not limited to use of such an exemplary energy beam. The respective braze powder 46, for example, may alternatively be sintered using an electron beam provided by an electron beam source. Furthermore, multiple energy beams (e.g., laser beams and/or electron beams) may be used for sintering the respective braze powder 46. In addition or alternatively, multiple nozzles 38 may be used to deliver the braze powders 46.

A component manufactured using a typical additive laser deposition welding process may be subject to: internal stresses thermally induced by relatively high welding temperatures (e.g., temperatures high enough to melt the substrate material); thermally induced distortion and/or warping; and/or reduction in material density caused by, for example, dendritic voids. By contrast, sintering the braze powder(s) 46 with the substrate 48 and then diffusion bonding the braze material(s) with the substrate 48 as described above subjects the substrate 48 to relatively low processing temperatures, compared to welding temperatures. The manufacturing methods of the present disclosure may thereby reduce or eliminate: thermally induced stresses; thermally induced distortion and/or warping; and/or reduction in material density associated with additive laser deposition welding techniques. The above laser braze cladding technique is also paired with the adaptive processing to reduce material consumption and/or require less post processing (e.g., machining, finishing, etc.) compared to traditional manual brazing techniques.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for providing a component, comprising:
depositing braze powder with a substrate, the braze powder sintered together during the depositing of the braze powder to provide the substrate with sintered braze material;
heating the sintered braze material to melt the sintered braze material and diffusion bond the braze powder to the substrate to provide braze filler material;
scanning a first object using computed tomography to provide first object scan data, the first object comprising the substrate and the braze filler material diffusion bonded to the substrate;
comparing the first object scan data to first object reference data to provide machining data; and
machining the first object using the machining data to provide a second object.

2. The method of claim 1, wherein the braze powder is deposited using an additive manufacturing device.

3. The method of claim 1, further comprising:
scanning the substrate using computed tomography to provide substrate scan data;
comparing the substrate scan data to substrate reference data to provide additive manufacturing data; and
the braze powder deposited with the substrate based on the additive manufacturing data.

4. The method of claim 3, wherein the substrate reference data comprises data from a design specification for the component.

5. The method of claim 3, wherein the first object reference data comprises the substrate scan data.

6. The method of claim 3, further comprising:
depositing second braze powder with the substrate based on the additive manufacturing data, the second braze powder different than the first braze powder and the second braze powder sintered together during the depositing of the second braze powder to provide the substrate with sintered second braze material;
heating the sintered second braze material to melt the sintered second braze material and diffusion bond the sintered second braze material to the substrate to provide second braze filler material; and
the first object further comprising the second braze filler material diffusion bonded to the substrate.

7. The method of claim 6, wherein
the braze powder is deposited with the substrate to repair a first type of defect of the substrate; and
the second braze powder is deposited with the substrate to repair a second type of defect of the substrate that is different than the first type of defect.

8. The method of claim 7, wherein the depositing of the braze powder includes
directing the braze powder towards the substrate through a nozzle; and
sintering the braze powder using a laser beam.

9. The method of claim 8, wherein the depositing of the second braze powder includes
directing the second braze powder towards the substrate through the nozzle; and
sintering the second braze powder using the laser beam.

10. The method of claim 1, wherein the machining removes some of the braze filler material diffusion bonded to the substrate.

11. The method of claim 1, wherein the braze powder is deposited with the substrate to fill a void in the substrate.

12. The method of claim 11, further comprising:
depositing second braze powder with the substrate to form a cladding on the substrate, the second braze powder different than the first braze powder and the second braze powder sintered together during the depositing of the second braze powder to provide the substrate with sintered second braze material;
heating the sintered second braze material to melt the sintered second braze material and diffusion bond the sintered second braze material to the substrate to provide second braze filler material; and
the first object further comprising the second braze filler material diffusion bonded to the substrate.

13. The method of claim 12, wherein the cladding covers the void that was filled with the braze powder.

14. The method of claim 12, wherein the braze powder comprises metal alloy powder and braze material powder with a lower melting point than the metal alloy powder.

15. The method of claim 14, wherein
the braze powder has a first ratio of the metal alloy powder to the braze material powder; and
the second braze powder comprises the metal alloy powder and the braze material powder, the second braze powder has a second ratio of the metal alloy powder to the braze material powder, and the second ratio is greater than the first ratio.

16. The method of claim 1, wherein the braze powder is deposited with the substrate to form a cladding over the substrate.

17. The method of claim 1, further comprising:
receiving a damaged component previously installed within an engine; and
the depositing, the heating and the machining performed to repair the damaged component to provide the component.

18. A method for providing a component, comprising:
scanning a substrate using a computed tomography device to provide substrate scan data;
comparing the substrate scan data to substrate reference data to provide additive manufacturing data;
depositing braze powder with the substrate using an additive manufacturing device based on the additive manufacturing data, the braze powder sintered to provide the substrate with sintered braze material;
heating the sintered braze material to melt the sintered braze material and diffusion bond the sintered braze material to the substrate to provide braze filler material;
scanning a first object using the computed tomography device to provide first object scan data, the first object comprising the substrate and the braze filler material diffusion bonded to the substrate;
comparing the first object scan data to first object reference data to provide machining data; and
machining the first object using the machining data to provide a second object.

19. The method of claim 18, wherein at least one of
the substrate reference data comprises data from a specification for the component; or
the first object reference data comprises the substrate scan data.

* * * * *